(12) United States Patent
Lopez-Anido et al.

(10) Patent No.: US 6,544,624 B1
(45) Date of Patent: Apr. 8, 2003

(54) MODULAR FIBER REINFORCED POLYMER COMPOSITE DECK SYSTEM

(75) Inventors: Roberto A. Lopez-Anido, Orono, ME (US); GangaRao V. S. Hota, Morgantown, WV (US); Ever J. Barbero, Morgantown, WV (US)

(73) Assignee: West Virginia University Research Corp., Morgantown, WV (US)

( * ) Notice: Subject to any disclaimer, the term of this patent is extended or adjusted under 35 U.S.C. 154(b) by 0 days.

(21) Appl. No.: 10/172,142

(22) Filed: Jun. 13, 2002

Related U.S. Application Data

(62) Division of application No. 09/088,152, filed on Jun. 1, 1998, now Pat. No. 6,455,131.
(60) Provisional application No. 60/048,360, filed on Jun. 2, 1997.

(51) Int. Cl.[7] .................................................. B32B 3/12
(52) U.S. Cl. .......................... 428/118; 428/33; 428/68; 428/73; 428/99; 428/101; 428/116; 428/117; 428/118; 428/141; 428/178; 428/212; 52/578; 52/586.1; 52/586.2; 52/783.11; 52/793.1
(58) Field of Search .............................. 428/33, 68, 73, 428/99, 116, 117, 118, 178, 141, 101, 212; 52/578, 586.1, 793.1, 783.11, 783.13, 586.2

(56) References Cited

U.S. PATENT DOCUMENTS 4,078,348 A    3/1978    Rothman .................... 52/309.7

(List continued on next page.)

OTHER PUBLICATIONS

Schmit, Lucien A.& Mehrinfar, Massood, "Multilevel Optimum Design of Structures with Fiber–Composites Stiffened–Panel Component," AIAA Journal, vol. 20, No. 1, Jan., 1982.

(List continued on next page.)

Primary Examiner—Donald J. Loney
(74) Attorney, Agent, or Firm—Steptoe & Johnson PLLC

(57) ABSTRACT

A modular fiber reinforced polymer (FRP) composite deck module having one or more hexagonal components and one or more double trapezoidal components. A hexagonal component is a hexagonal cell with all sides being of equal length and forming a hexagonal space. A double trapezoidal component has a top side, a bottom side, a first trapezoid having a first top and a first bottom, and a second trapezoid having a second top and a second bottom. The first and second trapezoidal components are of equal dimensions and configured such that the first trapezoid is inverted resulting in the first top of the first trapezoid is adjacent to the second top of the second trapezoid, thereby creating a center seam and an extensive bonding surface. The double trapezoidal and hexagonal components are made of multiple layers of multi-axial fiber reinforcement and a resin matrix, the layers being continuous throughout the entire shape of the components. A double trapezoidal component is manufactured using the Vacuum Assisted Resin Transfer Molding or pultrusion process. A composite deck module is made by joining a hexagonal component with a double trapezoidal component such that the hexagonal component interlocks within the double trapezoidal component and the two components are bonded together with adhesive. A mechanical fastener also may be used to hold two components together. An overlay may be placed over the top side of one or more double trapezoidal components joined together via hexagonal components, thereby providing a uniform surface. In addition, one or more exterior FRP composite laminates, grids, plates or fabrics may be bonded continuously to the top side. In certain embodiments, one or more of the hexagonal components and trapezoids of a composite deck module may be filled with a filler, e.g., thermal insulation, noise reduction insulation, or a strength enhancement.

18 Claims, 4 Drawing Sheets

U.S. PATENT DOCUMENTS

| | | | |
|---|---|---|---|
| 4,144,369 A | 3/1979 | Wass | 428/183 |
| 4,258,520 A | 3/1981 | Rehbein | 52/522 |
| 4,615,166 A | 10/1986 | Head | 52/369.11 |
| 4,730,428 A | 3/1988 | Head et al. | 52/389.11 |
| 4,879,152 A | 11/1989 | Green | 428/73 |
| 4,939,037 A | 7/1990 | Zion et al. | 428/36.3 |
| 5,309,690 A | 5/1994 | Symons et al. | 52/309.9 |
| 5,403,063 A | 4/1995 | Sjostedt et al. | 296/187 |
| 5,438,171 A | 8/1995 | Schmanski | 181/210 |
| 5,493,832 A | 2/1996 | Abrams | 52/264 |
| 5,547,737 A | 8/1996 | Evans et al. | 428/178 |
| 5,644,888 A | 7/1997 | Johnson | 52/651.01 |
| 5,794,402 A | 8/1998 | Dumlao et al. | 52/783.17 |

OTHER PUBLICATIONS

Burnside, Phillip; Barbero, Ever; Davalos, Julie & Hota, GangaRao V.S., "Design Optimization of an All–FRP Bridge", 38$^{th}$ International SAMPE Symposium, May 10–13, 1983.

McCormick, Fred C., "Field Study of a Pedestrian Bridge of Reinforced Plastic," Transportation Research Board, National Research Council, Transportation Research Record 1118, 1987.

Meir, U., "Proposal for a carbon fibre reinforced composite bridge across the Strait of Gibralter at is narrowest site", Proceedings of the Institute of Mechanical Engineers, vol. 201, No. B2, 1987.

Burnside, Phillip H., "Design Optimization of Fiber–Reinforced Composite–Material Guide for MAGLEV," published thesis, West Virginia University, Dept. of Mechanical and Aerospace Engineering, May, 1987 (pp 3–9, 16–25, 60–78).

Plecnik, Joseph, "Modular Fiberglass Bridge Deck System," unknown research proposal, approx. 1988.

Bolte, Philip L. (Ret. Brig. Gen.), "Assault and Tactical Bridging for Armor Units," Armor, Nov./Dec., 1988.

Starr, Trevor F., "Structural Applications for Pultruded Profiles", unknown publication, approx. 1990.

McGhee, Kevin K., "Optimum Design of Bridge Deck Panels Using Composite Materials," published thesis, University of Virginia, School of Engineering and Applied Science, May, 1990 (pp. 38–51, 101–143).

Kennedy, John B. & Grace, Nabil F., "Prestressed Continuous Composite Bridges Under Dynamic Load," Journal of Structural Engineering, vol. 116, No. 6, Jun. 1990.

Sotiropoulos, Sotiris N. & Hota, GangaRao V.S., "Bridges Systems Made of FRP Components," published, International Symposium on Composite Materials with Textile Reinforcement, Lyon, France, 1991.

Furlong, Bob, "Israeli Combat Bridging Systems", unknown publication, approx. 1991.

McGhee, Kevin K.; Barton, Furman W.; & McKeel, Wallace T., "Optimum Design of Composite Bridge Deck Panels," published, Advanced Structural Composite Engineering (ASCE) Conference, Jan. 1991.

Lopez–Anido, Roberto A. & Hota, GangaRao V.S. "Optimization of a New Stiffened Trapezoid Shape for Decks," CPAR Project Report, Aug. 28, 1995.

Busel, John P., Sep. 14, 1995 Meeting Minutes, Optimized Structurals CPAR Project.

Barno, Douglas S., Feb. 15, 1996 Meeting Minutes, Optimized Structures CPAR Project.

Busel, John P., Apr. 4, 1996 Meeting Minutes, Optimized Structurals CPAR Project.

Lopez–Anido, Roberto A. ; Hota, GangaRao V.S.; Trovillion, Jonathan & Busel, John, "Development and Demonstration of a Modular FRP Deck for Bridge Construction and Replacement," International Composites EXPO 1997 Conference, Nashville, Tenn., Jan. 27–29, 1997.

Lopez–Anido, Roberto A. ; Hota, GangaRao, Hota .V.S.; Vedam, Venkata & Overly, Nikki, "Design and Evaluation of a Modular FRP Bridge Deck," International Composites EXPO 1997 Conference, Nashville, Tenn., Jan. 27–29, 1997.

Lopez–Anido, Roberto A.; Hota, GangaRao V.S. & Barbero, Ever, "FRP Modular System for Bridge Decks," Proceedings of Structure Congress XV, vol. 2, Portland, Oregon, Apr. 13–16, 1997.

MODULAR FIBER REINFORCED POLYMER COMPOSITE DECK SYSTEM

REFERENCE

This application is a conversion of provisional patent application No. 60/048,360, filed Jun. 2, 1997, entitled "Modular Fiber Reinforced Polymer (FRP) Composite Deck System Contractual Origin of the Invention" and is a divisional of Ser. No. 09/088,152, filed Jun. 1, 1998, now U.S. Pat. No. 6,455,131 entitled the same.

CONTRACTUAL ORIGIN OF THE INVENTION

The United States Government has rights in this invention pursuant to Contract No. CPAR/CRDA, OSP Reference No. 93-551A between the United States Army Corps of Engineers Construction Engineering Research Laboratories (USACERL) and West Vets University Research Corporation.

BACKGROUND OF THE INVENTION

1. Field of the Invention

This invention relates to fiber reinforced polymer (FRP), and more specifically, to lightweight fiber reinforced polymer composite decks for structural support systems and to a method of manufacturing said FRP composite decks. The lightweight FRP composite decks are composed of reinforced fibers and matrix resin, configured for infrastructure and constructed facilities such as elevated highway structures and wall and decking systems.

2. Related Art

Structural panels are continually needed in constructing and repairing walls, floors, decking, bridges, roofs, and the like. In the prior art, conventional construction materials, e.g., steel, concrete, and wood, are used for high performance deck and wall structures because such materials typically have a high load bearing capacity.

There are several disadvantages associated with using such conventional construction materials in structural panels. First, such structural panels have a short service life in that they degrade over time: steel panels corrode, concrete panels spall, and wood panels rot. Second, such structural panels tend to be very heavy in order to achieve the required load bearing capacity for the specific application. Third, such structural panels require a long time for creation and erection because they are typically built and installed on site.

To accommodate some of the disadvantages with conventional construction materials, the prior art includes fiber reinforced polymer (FRP) composite materials made with a honeycomb core and an outer skin. In addition, panels made of conventional FRP composite materials have lineal profiles mainly reinforced with continuous fibers in the axial direction.

There are several disadvantages associated with using such conventional FRP materials in structural panels. First, although conventional FRP composite materials are lightweight, they lack the required load-bearing capacity to handle high performance deck and wall structures. Therefore, conventional FRP composite materials are used only for light duty floor systems and building panels. Second, conventional FRP composite panels often develop moisture ingress and resin-dominated failure with respect to the honeycomb core and an outer skin. Third, the lineal profile and use of continuous fibers in the axial direction result in a reduced load bearing capacity.

Therefore, there is a need for a FRP composite panel that is lightweight, yet has a high load rating due to high strength to weight ratio. There is a further need for a FRP composite panel that has a long service life due to its resistance to corrosion. There is still a further need for a FRP composite panel that is easy and quick to erect and become operational.

There is also a need for a FRP composite deck system that is lightweight, yet can withstand the heavy loads associated with highway bridges and decking systems. The FRP composite deck systems must also have a long service life and be prefabricated to allow for easy and quick installation.

SUMMARY OF THE INVENTION

The present invention solves the problems associated with conventional structural panels by providing a fiber reinforced polymer (FRP) composite panel. A FRP composite panel comprises a plurality of components, joined through a shear key system that provides an extensive bonding surface and a mechanical interlock. Each component is further comprised of a plurality of cells, each cell having four or more sides wherein at least two adjacent sides intersect at an obtuse angle, offset from ninety (90) degrees.

The fiber architecture of the components comprises multiple layers of multi-axial stitched fabrics, unidirectional rovings, woven cloth, and mats used as reinforcements. The fiber architecture develops fiber continuity between the cell components and provides adequate fiber reinforcement along main stress paths.

The cross sectional cellular shape and fiber architecture of the FRP composite panels of the present invention provide distinct advantages over the prior art. First, the FRP composite panels of the present invention provide a lightweight, strong and durable structure that will not corrode like steel, spall like concrete, or rot like wood. Therefore, the panels of the present invention have a long service life and a reduced maintenance cost due to these fatigue and corrosion resistant properties.

Second, the FRP composite panels of the present invention have enhanced load bearing and interlocking capacity as compared to conventional FRP floor systems and building panes. The high load ratings are due to the high strength to weight ratio of the panels, resulting in a panel of the present invention having 3 to 4 times the load capacity of a reinforced concrete deck with only twenty percent (20%) of the weight. Further, stiffness of an FRP composite panel in the direction perpendicular to traffic is adequate to provide the transverse load distribution to supporting beams.

Third, the fiber architecture of the present invention is reinforced with heavy multi-axial stitched fabrics, continuous rovings woven cloth and mats resulting in superior mechanical properties as compared to existing FRP composite lineal profiles. In addition, the composite fiber architecture overcomes the problems associated to moisture ingress and resin-dominated failure observed in panels with honeycomb core and outer skins.

In a specific application of FRP composite panels of the present invention, FRP composite deck system comprise a plurality of cells having a double trapezoidal component and a hexagonal component for highway bridges and other decking applications. These components are prefabricated and joined together with an adhesive to form a modular FRP composite deck system. In addition to the extensive bonding surface, a mechanical connector may be used to increase the shear transfer capacity of the panel.

FRP composite panels of the present invention can be property designed, fabricated, and installed very efficiently. Such FRP composite panels can be used to replace deteriorated concrete or timber decks or to build new decks.

Further, such panels can be assembled with composite stiffening beams to develop an all-composite short-span bridge superstructure. Construction and replacement applications of the modular FRP composite structural panels and decks include, but are not limited to: highway bridge decks, short span highway bridge structures, pedestrian bridges, floor systems, retaining walls pilings, waterfront piers, platforms, launch bridges, utility poles, pipes, blast resistant structures, shock absorber structures, framing structures (for tunnels, buildings, mines, and the like), and alternative comparable applications.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS a. Structure of FRP Composite Structural Panels The preferred embodiment of the present invention is a modular structural panel system comprised of a plurality of components, wherein each component is constructed of fiber reinforced polymer composite materials. The components are connected together through interlocking to form a modular structural panel of varying width.

Figure 1:
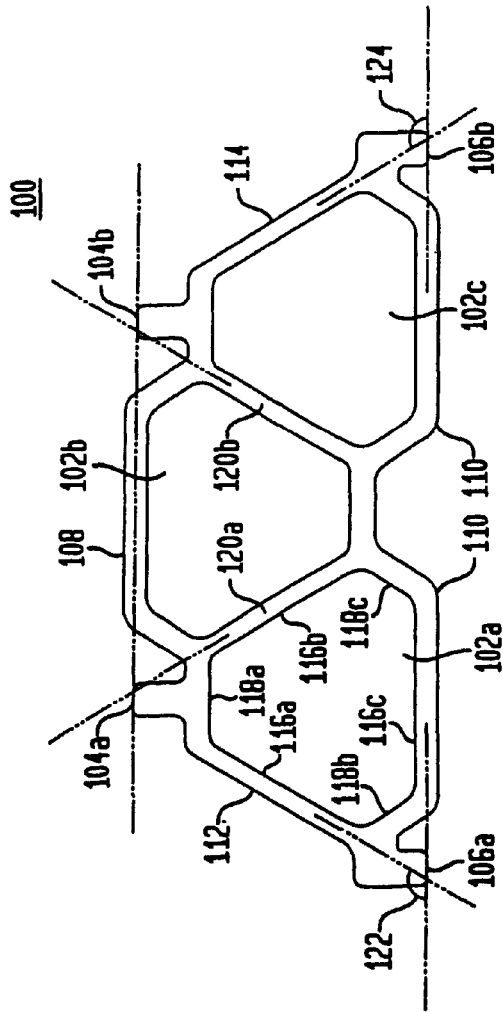
FIG. 1 is a planar view showing a cross section of a fiber reinforced polymer (FRP) composite structural panel component of the present invention.

FIG. 1 illustrates a cross section of a fiber reinforced polymer (FRP) composite component 100 of the present invention. The shape of a component 100 is a stiffened trapezoid having a top side 108, a bottom side 110, a first edge side 112 and a second edge side 114. In the preferred embodiment, a component 100 comprises three cells 102a–c, each cell 102a–c having the same hexagonal shape, thereby creating a first internal cell wall 120a and a second internal cell wall 120b.

For convenience purpose only, cell 102a will be described in more detail, however, the remaining cells 102b–c are identical in composition and shape to cell 102a. Cell 102a is a hexagon being of triangular shape with the corers chopped off; resulting in three long sides 116a–c and three short sides 118a–c.

The important feature of the cell 102a shape is that the projection of the center lines of two adjacent sides of a cell 102a intersect with the middle line of the top and bottom sides at specific key points that define a triangular mesh template. The structural panel configuration based on a triangular mesh template results in transfer of forces through membrane action similarly to a truss system, which increases the transverse strength and stiffness of the structural panel system.

A second important feature is that no more than three sides of said cells converge to a given point. This avoids problems of fiber placement as well as increases the strength and load bearing capacity of the component 100.

Another feature of the cell 102a shape is that two adjacent sides of a cell 102a intersect at an obtuse angle offset from nine (90) degrees. For example, with the illustrated cell 102a shape, each long side 116a intersects a short side 118a at an obtuse angle. In the preferred embodiment, this feature of the cells 102a results in the first edge side 112 intersecting the top side 108 and the bottom side 110 at an obtuse angle 122 offset from ninety (90) degrees, as well as the second edge side 114 intersecting the top side 108 and the bottom side 110 at an obtuse angle 124 offset from ninety (90) degrees. This use of obtuse angles allows the component 100 to have greater load bearing capacity.

In operation, when building a composite structural panel of the present invention, two components 100 are placed next to each other with one component 100 being inverted such that the first edge side 112 of the first component 100 is adjacent to the second edge side 114 of the second component 100. This matching of the first edge side 112 and the second edge side 114, of two components 100, creates an interlocking, or joining, shear key system with an extensive bonding surface. The bonding surface is extensive in that as discussed above, the first edge side 112 and the second edge side 114 are offset from ninety (90) degrees. In contrast if the first edge side 112 and the second edge side 114 were perpendicular, or at ninety (90) degrees, joining, or interlocking, would not be attained and a minimum bonding surface results because the first edge side 112 and second edge side 114 are the shortest possible lengths between the top side 108 and the bottom side 110.

In joining two components 100, an adhesive is used such that the bonding surface of the two components 100 and the adhesive carry shear force of the component 100, thereby contributing to the interlocking, or joining, system. In the preferred embodiment, the adhesive is a commercially available polymer system for bonding FRP to FRP with proven properties. It would be readily apparent for one of ordinary skill in the art to select and use the appropriate adhesive bonding system.

The preferred embodiment of the component 100 also comprises two top mechanical interlocking stubs 104a–b and two bottom mechanical interlocking stubs 106a–b to provide a reserve transfer shear strength and to facilitate the field installation of the components 100. The top mechanical interlocking stubs 104a–b and the bottom mechanical interlocking stubs 106a–b are described in greater detail below.

The component 100 of the present invention is described with this cellular structure for convenience purpose only. It would be readily apparent to one of ordinary skill in the art to design and manufacture a component 100 using a different overall shape from the stiffened trapezoidal shape, comprised of a different number of cells, and the cells having a different cell shape while maintaining the offset from ninety (90) degrees between adjacent cell sides. For example, an alternative embodiment of a component 100 may comprise one or more cells, each cell being trapezoidal in shape. The number and shape of the cells of a component 100 is determined according to the needed dimensions of the final composite structural panel, the installation equipment, and the fabrication constraints. It would be readily apparent to one of ordinary skill in the art to determine the number of cells and the cell shape of a component 100 for a particular application of a component of the present invention.

In the preferred embodiment, the component 100 of the present invention is made of a plurality of commercially available fiber layers in the form of rovings, unidirectional rovings, multiaxial fabrics, woven cloth and chopped or continuous strand mats. The resin matrix holding the fiber layers together is a commercially available polyester, vinyl ester, epoxy or phenolic resin. It would be readily apparent to one or ordinary skill in the relevant art to design and manufacture a component 100 composite fiber architecture suitable for a particular application.

Figure 2:
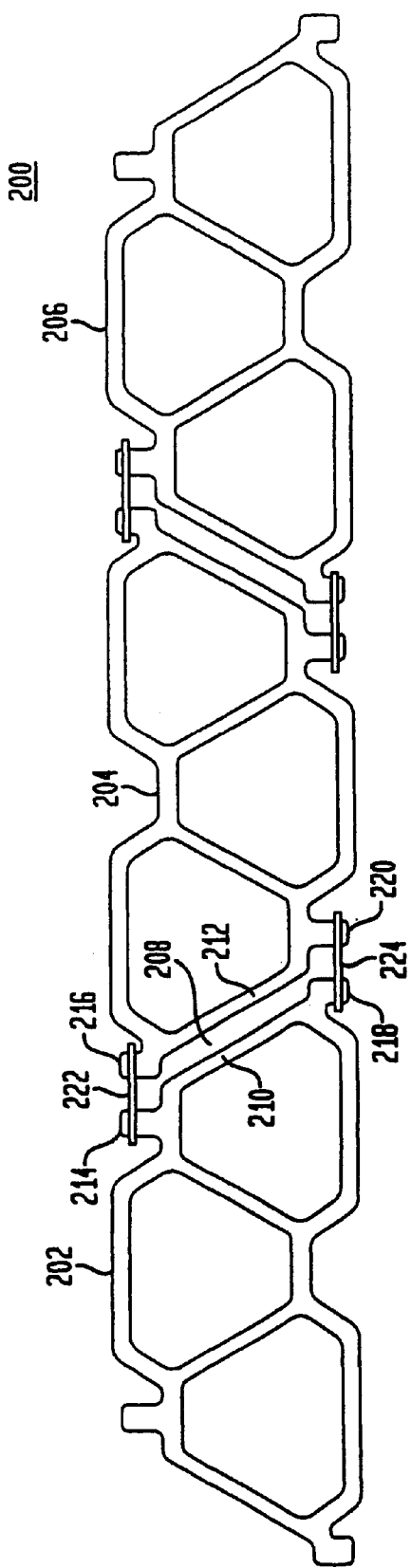
FIG. 2 is a planar view showing a cross section of a plurality of FRP composite panel components joined together, thereby forming a FRP composite structural panel.

FIG. 2 illustrates a plurality of FRP composite component 100 joined together, thereby forming a FRP composite structural panel 200. FIG. 2 shows three components 202, 204, 206 joined together, wherein each pair of components 202, 204 and 204, 206 are joined by the same shear key method. The joining of two components 202, 204 will be discussed in greater detail below as an illustration of joining any two components 100 of the present invention. It would be readily apparent to one of ordinary skill in the art to join together any number of components 100 to reach a FRP composite structural panel of any size.

As discussed above, when joining a first component 202 to a second component 204, one of the components 202, 204 is inverted thereby creating a joining or interlocking shear key system and an extensive bonding surface 208 with the first edge side 210 of the first component 202 and the second edge side 212 of the second component 204 when the two components 202, 204 are bonded together with adhesive. In addition to the adhesive, the first component 202 and the second component 204 are mechanically joined in the preferred embodiment. More specifically, the top mechanical interlocking stub 214 of the first component 202 is connected to the bottom mechanical interlocking stub 216 of the second component 202 via a first fastener, a dowel or an exterior interlocking channel 222, and the bottom mechanical interlocking stub 218 of the first component 202 is connected to the top mechanical interlocking stub 220 of the second component 202 via a second fastener, a second dowel or an exterior interlocking channel 224. The fasteners, dowels or exterior interlocking channels 222, 224 comprise nuts and bolts, a piece of metal slipped over the mechanical interlocking stubs, an exterior channel clamping the mechanical interlocking stubs or comparable means for securing a top mechanical interlocking connection 214 with a bottom mechanical interlocking connection 216.

Once a FRP composite structural panel system 200 is assembled using one or more components 100, one or more exterior FRP composite laminates, grids, plates or fabrics can be bonded continuously to the top face or to the top face and the bottom face of the FRP composite panel system 200 to increase strength and stiffness. Once a FRP composite structural panel 200 is assembled using one or more components 100, one or more exterior layers can be overlaid on top of the FRP composite panel system 200. Example exterior layers include concrete, polymer concrete, asphalt, drywall, paneling, sheet metal, grating, or the like, depending on the specific application of the FRP composite panel 200. It would be readily apparent to one of ordinary skill in the relevant art to add an exterior layer or overlay on top of the FRP composite structural panels 200.

b. Structure of FRP Composite Deck System

Figure 3:
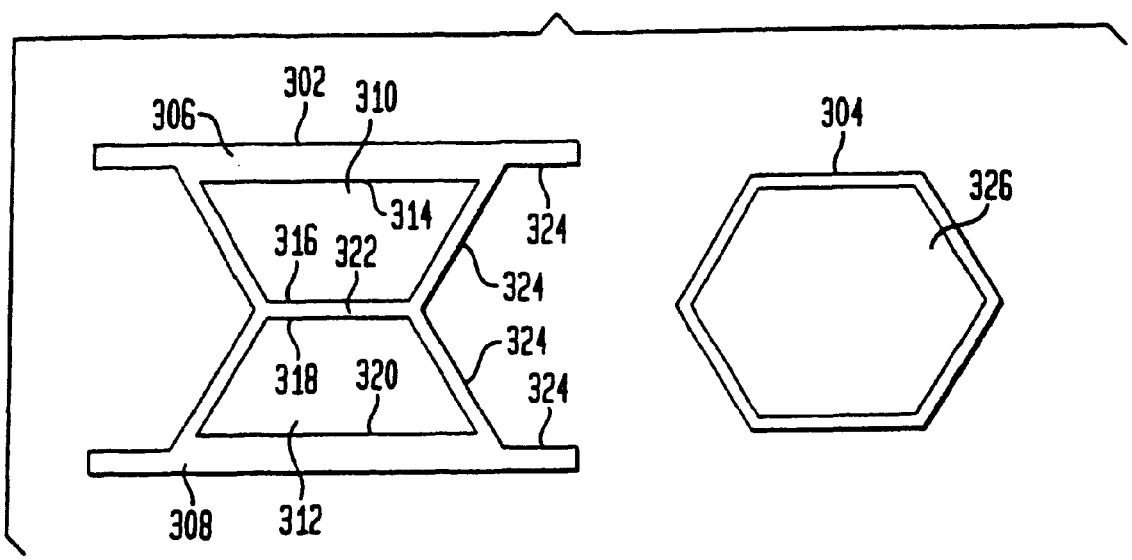
FIG. 3 is a planar view showing a composite double trapezoidal component and a composite hexagonal component of a FRP composite deck system of the present invention.

FIG. 3 illustrates a double trapezoidal component 302 and a hexagonal component 304 of a FRP composite deck system of the present invention. The FRP composite deck system of the present invention is a specific application of the FRP composite structural panel 200 described above wherein the cell shape is not uniform throughout a panel, but comprises two separate shapes, a composite double trapezoidal component 302 and a composite hexagonal component 304, which are designed especially for deck configurations, e.g., highway bridges. The hexagonal component 304 acts as a "key", or a key component, for joining two double trapezoidal components 302. Therefore, the double trapezoidal components 302 acts as receiving components for the hexagonal component 304.

The FRP composite deck system of the present invention is described in terms of a hexagonal component 304 and a double trapezoidal component 302 for convenience purpose only. It would be readily apparent to one of ordinary skill in the relevant arts to design and implement a key component and a receiving component using different shapes.

The double trapezoidal component 302 comprises a top side 306, a bottom side 308, a first trapezoid 310 having a first top 316 and a first bottom 318, and a second trapezoid 312 having a second top 318 and a second bottom 320, wherein the first trapezoid 310 and the second trapezoid 312 are of equal dimensions. In addition, the first trapezoid 310 and the second trapezoid 312 are arranged such that the first top 316 is adjacent to the second top 318, thereby creating a center seam 322. Further, the first bottom 314 is incorporated into the top side 306 and the second bottom 320 is incorporated into the bottom side 308. An extensive bonding surface 324 is located on the side of the double trapezoidal component 302. Also, the extension of the top side 306 and the bottom side 308 beyond the first trapezoid 310 and the second trapezoid 312 are for convenience purpose only. An alternative embodiment of the present invention, the top side 306 and the bottom side 308 may not have such an extension.

Figure 4:
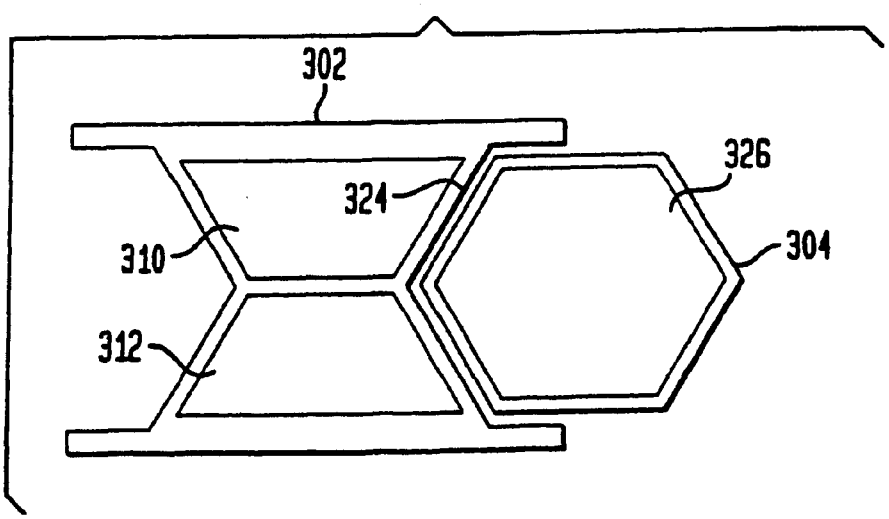
FIG. 4 is a planar view showing the joining of the composite double trapezoidal component and the composite hexagonal component.

The hexagonal component 304 is a pure hexagon wherein all sides are of equal length and a hexagonal space 326 is created. The hexagonal component 304 is sized such that it fits within the extensive bonding surface 324 of the double trapezoidal component 302 as shown in FIG. 4.

Similar to the FRP composite panel component 100 described above, an important feature of the double trapezoidal component 302 and the hexagonal component 304 is that each component has two adjacent sides that intersect at an angle offset from ninety (90) degrees. For example, regarding the double trapezoidal component 302, two sides intersect at obtuse angles and two sides intersect at acute angles. Regarding the hexagonal component 304, each side intersects with its neighboring side at an obtuse angle. Also similar to the FRP composite panel component 100 described above, the occurrence of such obtuse angles results in an interlocking shear key system with an extensive bonding surface 324 between the double trapezoidal component 302 and the hexagonal component 304. In the preferred embodiment, the internal angles of the hexagonal component 304 is 136 degrees, however, this angle is for convenience purpose only. It would be readily apparent to one of ordinary skill in the art to use a comparable angle.

The double trapezoidal component 302 and the hexagonal component 304 comprise an optimum fiber architecture made of multi-axial fabrics, continuous strand rovings, woven cloth and chopped or continuous strand mats. The fiber content is selected to attain high strength and stiffness properties with good fiber wet-out. The present invention uses different fiber types according to a specific application. In the preferred embodiment the fiber types are carbon, glass, and aramid which are typically used for heavy load applications, and the natural fiber type, jute, is used for lower load applications. In addition, fiber reinforcement can be made of one type of fibers or by a suitable combination of fiber types. Fibers, fabrics, and mats are well known in the relevant art and are commercially available. It would be readily apparent for one or ordinary skill in the relevant art to use the needed fiber types and fiber architecture for the deck system of the present invention and according to a specific decking application.

Also in the preferred embodiment, the resin matrix holding the fabric layers together is determined by the specific application of the resulting FRP composite deck system. For example, vinyl ester resin is used for exposure to harsh environments such as for a highway bridge. A polyester resin is used for buildings and other internal wall/flooring structures. Phenolic resin is used for applications with strict fire specifications. Fire retardant additives, ultra violet inhibitors, as well as other additives and fillers may also be added to the resin. Vinyl ester, polyester, and phenolic resin systems are commercially available and are well known in the relevant arts. It would be readily apparent for one of ordinary skill in the relevant art to use these, or comparable, resins for a specific application of the FRP composite deck system.

In an alternative embodiment, the first trapezoid 310, the second trapezoid 312 and the hexagonal component 304 are internally filled with a filling material for the purpose of noise reduction, thermal insulation, strength enhancement, or for a comparable purpose. It would be readily apparent to one of ordinary skill in the relevant art to select an appropriate filling material and fill the double trapezoidal component 302 and the hexagonal component 304.

FIG. 4 illustrates the interlocking of a double trapezoidal component 302 and a hexagonal component 304, wherein the hexagonal component 304 is used as a key for interlocking, or joining, two double trapezoidal components 302. In the preferred embodiment, a double trapezoidal component 302 and a hexagonal component 304 are joined by a shear key method and an adhesive bonding along the extensive bonding surface 324 between the components 302, 304. In an alternative embodiment, the double trapezoidal component 302 and the hexagonal component 304 can be secured together with a mechanical fastener, e.g. nuts and bolts or blind bolts. A mechanical fastener can be used in addition to, or in place of, the adhesive bonding. In the preferred embodiment, blind bolts are used to achieve the best performance. Mechanical fasteners are well known in the relevant art. It would be readily apparent to one of ordinary skill in the relevant art to use a mechanical fastener.

Figure 5:
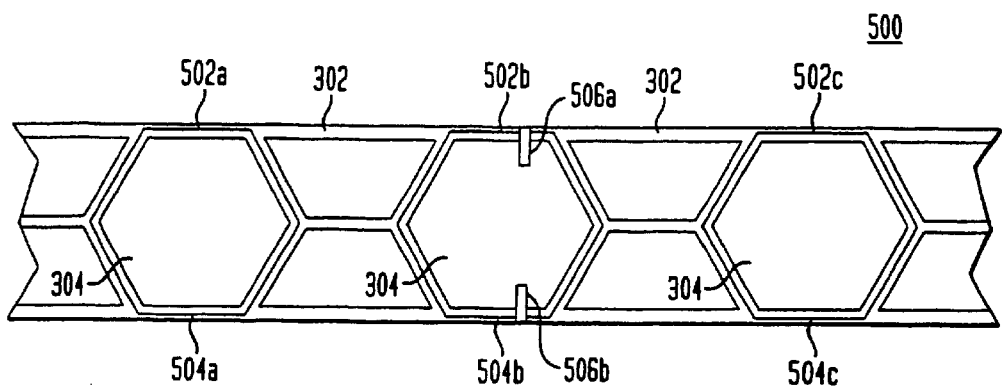
FIG. 5 is a planar view showing a plurality of joined composite double trapezoidal components and composite hexagonal components, thereby forming a FRP composite deck System of the present invention.

FIG. 5 illustrates a plurality of double trapezoidal components 302 joined with a plurality of hexagonal components 304, thereby forming a FRP composite deck module 500 of the present invention. A FRP composite deck module 500 is prefabricated to any desired width.

Figure 6:
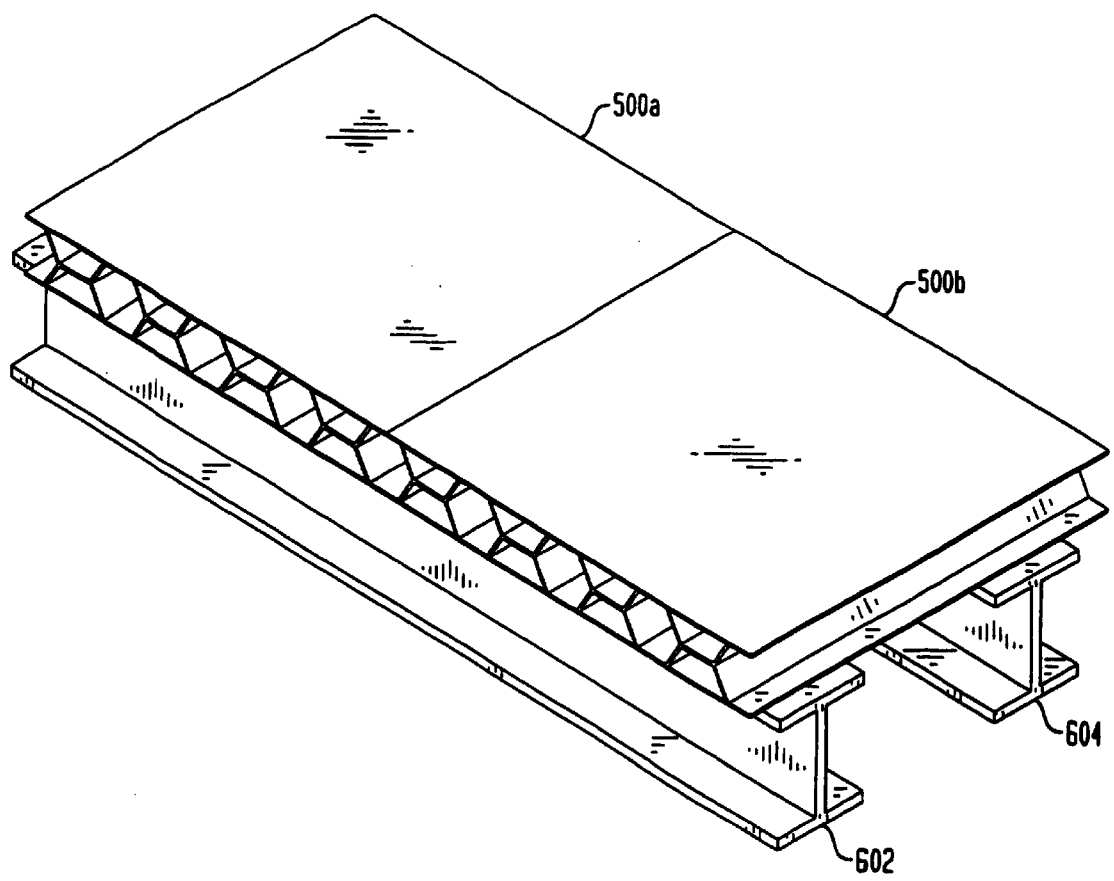
FIG. 6 is a isometric view of a plurality of FRP composite deck components assembled into two FRP composite deck modules and supported on beams.

FIG. 6 illustrates two FRP composite deck modules 500a, 500b supported on two beams 602, 604. In operation on a highway or bridge, the FRP composite deck modules 500a, 500b can be placed traversal or parallel to the automobile traffic direction. The use of beams 602, 604 are optional and are required only if the specific application of the FRP composite deck modules 500a, 500b require such additional support. In the preferred embodiment of the present invention, the beams are spaced up to nine (9) feet apart. It would be readily apparent to one of ordinary skill in the relevant art to use steel, concrete, wood, FRP composite or comparable support, beams and to space the beams at other distances.

Figure 7:
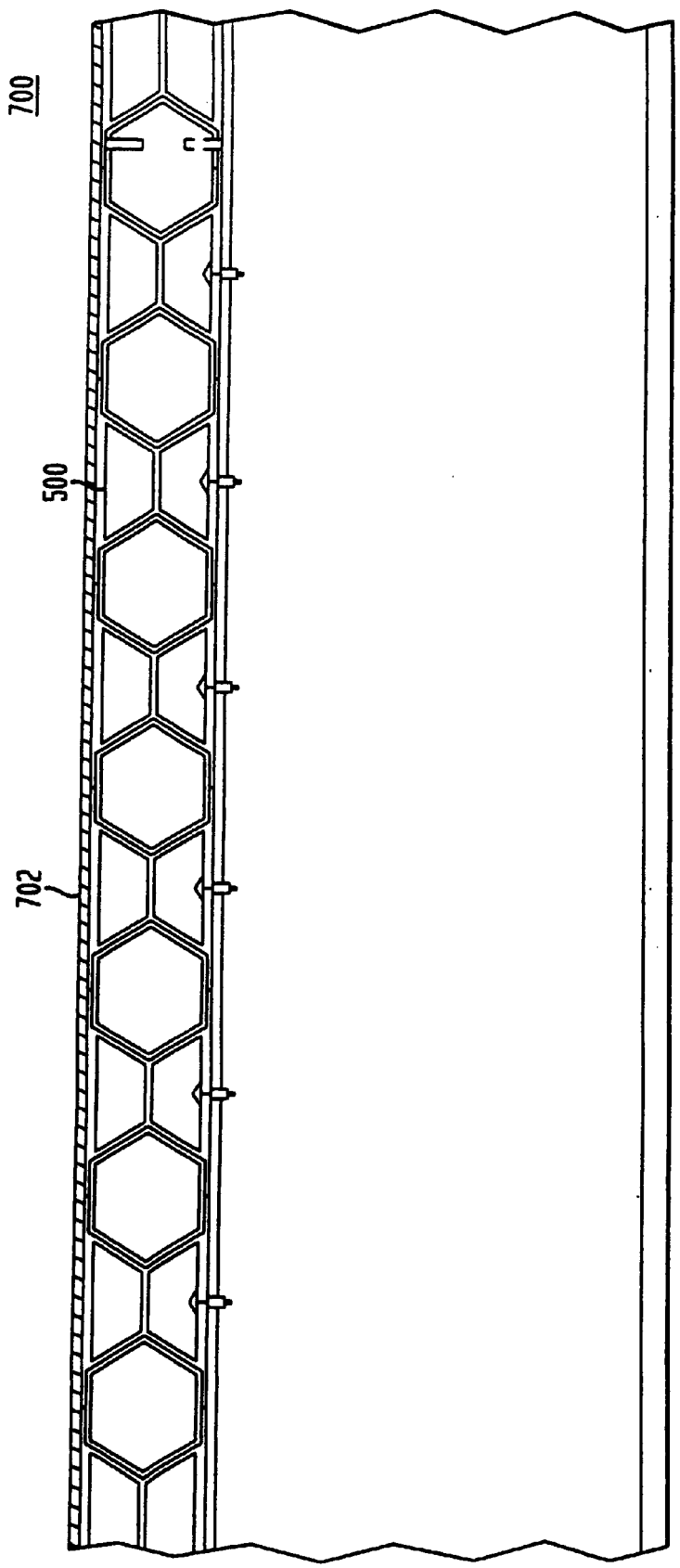
FIG. 7 is a planar view showing a cross section of a FRP composite deck module connected to a beam and used as a bridge deck.

FIG. 7 illustrates a cross section of FRP composite deck system 500 used as a bridge deck 700. The bridge deck 700 comprises one or more FRP composite deck modules 500 interlocked together via the extensive bonding surface 324 and optional mechanical fasteners. The preferred embodiment of the present invention places a suitable overlay 702, or wearing surface, e.g., concrete, asphalt, thin polymer concrete, or bonded grid anti-skid surface, on top of the FRP composite deck modules 500, thereby creating a uniform and contiguous top surface. The resin binder for a polymer concrete overlay 702 can be polyester or epoxy resin systems.

Alternatively, the overlay 702 may be made of asphalt concrete or Portland cement concrete with appropriate additives or modifiers. The bond between the FRP composite deck modules 500 and the overlay 702 can be enhance by surface treatment, e.g. sandblasting and the use of a primer material. In addition, other surface can be placed over the top side of the bridge deck 700 prior to the overly to improve the bridge deck's 700 strength and durability. For example, one or more of the following may be used: exterior FRP composite laminates, plates, or fabrics bonded continuously to the top side.

It would be readily apparent for one of ordinary skill in the relevant art to use comparable overlays 702, wearing surfaces or layers on top of FRP composite deck modules 500.

c. Fabrication of FRP Composite Panel Components and Deck Modules

The modular FRP composite component 100 and FRP composite deck module 500 of the present invention are designed to be manufacturing transparent. The panels are made using a fiber architecture having a plurality of layers of multi-axial fiber reinforcement in a polymeric resin matrix. A specific fiber architecture is designed according to the needed performance requirements of the structural panels and the cells therein. Fiber architecture, and the design thereof, is well known in the art and there are many commercially available multi-axial fiber reinforcements and polymeric resin matrices. It would be readily apparent to one of ordinary skill in the relevant art to design and manufacture a fiber architecture for a FRP composite component 100 and FRP composite deck module 500 of the present invention to handle a specific application.

In the preferred embodiment, the FRP composite components 100 and deck modules 500 are fabricated by pultrusion. Pultrusion is a continuous process for making a lineal composite profile with a constant cross section. The advantages of pultrusion for mass-production are: (1) low labor cost (the process requires little operator input other than to maintain mats supply), (2) low operating costs, (3) minimal material wastage, and (4) high production rate.

Pultrusion is well known in the relevant art, however conventional uses of pultrusion involve only lightweight fabrics and mats for transverse reinforcement, whereas the FRP composite component 100 and deck modules 500 of the present invention may comprise heavy fabrics. Further, the present invention uses pultrusion for using fabrics continuously throughout the entire cells 102a–c of the FRP composite component 100 and throughout the entire double trapezoidal components 302 and the hexagonal components 304 of the FRP composite deck module 500. This continuous use of fabrics eliminates the use of multiple seams thereby improving and strengthening the joints and intersections of the components.

The conventional pultruded panels have been reinforced with unidirectional continuous rovings (a group of untwisted parallel strands). Although, continuous or chopped strand mats (CSM) are used in the conventional pultruded panels to provide a minimum transverse reinforcement, these conventional panels typically lack in transverse fiber reinforcement to provide continuity between the sides of the cells that comprise the panels.

In the preferred embodiment for heavy duty highway applications, the double trapezoidal component 302 and the hexagonal component 304 are made of continuous strand rovings, continuous strand mats and multiaxial stitched fabrics. The fabric with reinforcement in (+/−45/90) directions is commercially available from Brunswick Technologies, Inc. The triaxial fabric weighs 1356 g/m2 (40 oz/sq.yd.). The profiles were also reinforced in the axial direction with Type 30 (R) continuous roving from Owens Corning. This use of heavy stitch fabric has efficiently contributed to reinforce the double trapezoidal component 302 and the hexagonal component 304. The resin system of the preferred embodiment is vinyl ester 580N from Reichhold Chemicals.

The double trapezoidal components 302 and the hexagonal components 304 are bonded along the extensive bonding surface 324 using an adhesive that satisfies the following properties: good elongation, high peel and energy absorbing properties, fatigue resistance, environmental resistance (humidity, salt spray, −20 F. to 140 F. temperatures), working time of at least 30 minutes, minimum surface preparation, acceptance of variable bond line thickness (30–120 mils), good gap filling capabilities (to compensate fabrication tolerances), and ease of application for field conditions. Based on the foregoing, the preferred adhesive for heavy load, highway applications is two part urethane, PLIOGRIP 6600 from Ashland Chemicals.

Also in the preferred embodiment the double trapezoidal components 302 and the hexagonal components 304 are assembled into a FRP composite deck module 500 up to eight (8) feet wide, which is based on shipping restrictions only, and weighing approximately 106 kg/m2 (22 lbs/sq.ft.). The length of the FRP composite deck module 500 corresponds to a bridge width.

The preferred embodiment of the FRP composite deck module 500 are described in these terms for convenience purpose only. It would be readily apparent for one of ordinary skill in the relevant art to manure double trapezoidal components 302 and the hexagonal components 304 of a comparable fabric architecture, using a comparable resin matrix and adhesive, and to create a FRP composite deck module 500 of different dimensions.

In an alternative method of manufacturing, the FRP composite panel component 100 and the FRP composite deck module 500 are manufactured by Vacuum Assisted Resin Transfer Molding (VARTM), e.g. Seeman Composites Resin Infusion Molding Process (SCRIMP™). VARTM is well known in the relevant art and can be used to fabricate large deck panels with minimum tooling.

The fiber architecture of the FRP deck system fabricated by VARTM is made of bi-, tri-, and quadri-axial fabrics, designed to develop fiber continuity between all of the sides of the double trapezoid component 302, e.g., the top side 306 and the sides of the first trapezoid 310, and to provide adequate fiber reinforcement along main stress paths. In the preferred embodiment for heavy duty systems, the fabric architecture of the top side 306 and the bottom side 308 of a double trapezoid component 302 comprise the following layers: 2 plies QM6408 (warp in x), 2 plies CM5005 (warp in y), 3 plies QM6408 (warp in x), and 2 plies CM5005 (warp in y). The first trapezoid 310, second trapezoid 312, and the hexagonal component 304 comprise layers of 2 plies QM5608 (warp in y). Further, the center seam 322 comprises layers of 2 plies TVM3408 (warp in y). The different fiber architecture is used in the double trapezoidal component 302 and the hexagonal component 304 according to the different performance requirements of each component. Multi-axial fabrics are well known in the relevant art and are commercially available. In addition, fiber material, such as glass, carbon, and aramid, are also well known and are typically used for heavy duty loads, whereas the natural fiber, jute, is well known in the art and is typically used for smaller load applications.

d. Field Installation of FRP Composite Deck System

1. Laurel Lick Bridge

Laurel Lick Bridge, located in Lewis County, West Virginia, made of timber deck on steel stringers, was in critical condition and needed to be replaced. In April–May 1997, a new bridge was constructed using RP composite deck modules 500 and supported by wide flange pultruded beams. Therefore, the final bridge is an all composite superstructure. The length of the new bridge is twenty (20) feet and the width is sixteen (16) feet. In addition, the new bridge used abutments made of wide flange pultruded column/piles (12"×12"×0.5") and multicellular panels with a reinforced concrete cap beam.

The FRP composite deck modules 500 are placed transversely to traffic direction and are supported by longitudinal beams. The FRP composite deck modules 500 are eight (8) inches in depth which is the average thickness of concrete decks. The enhanced fiber architecture of the FRP composite deck modules 500 incorporates E-glass fibers in the form of multi-axial stitched fabrics, continuous rovings, continuous strand mats and chopped strand mats. The matrix for binding the fiber layers together is a vinyl ester resin with good weatherability and resistance to harsh environments.

The FRP composite deck modules 500 are joined through a shear key system that provides mechanical interlock and an extensive bonding surface 324. High performance polyurethane adhesive is used to assemble the double trapezoidal components 302 and the hexagonal components 304 into FRP composite deck modules 500 that were then shipped to the bridge site.

The FRP composite deck modules 500 are connected to the support beams using an adhesive and engineered 2 inch blind fasteners from Huck International, Inc. Further, a-thin polymer concrete overlay or wearing surface is applied on the FRP composite deck modules 500. First, a urethane-based primer is applied to enhance adhesion to the FRP composite deck modules 500. Then, the polymer concrete is applied by the broom and seed, or broadcast, method. The thickness of the polymer concrete overlay is approximately ⅜ inch. The polymer concrete binder is isophthalic unsaturated polyester resin.

FRP composite deck modules 500 were used to develop a modular bridge deck that has high strength and stiffness to weight ratios, that is non-corrosive, and that has good fatigue resistance. The FRP composite deck modules 500 and the fiber architecture were designed to provide optimal structural performance for highway bridge loads and fabricated by pultrusion.

2. Wickwire Run Bridge

The Wickwire Run Bridge, located in Taylor County, West Virginia, was in critical condition and needed to be replaced. In July–August 1997, a new bridge was constructed using FRP composite deck modules 500 and supported by wide flange steel beams. The length of the new bridge is twenty (30) feet and the width is sixteen (21.7) feet.

FRP composite deck modules 500 up to eight (8) feet wide were connected through a shear key system. A two-part urethane adhesive was used to bond the double trapezoidal components 302 and the hexagonal components 304. Further, self countersinking blind fasteners (Floortight from Huck International, Inc.) were used to facilitate the connection of deck modules, and to provide reserve shear strength. The FRP composite deck modules 500 were tied down to support beams (steel or composite) using engineered 2 inch blind bolts (BOM from Huck International, Inc.) and bonded with an adhesive. Composite edge caps made of flat sheets and angles were used to close the cells on both sides of the deck. Finally, the FRP composite deck modules were connected to expansion dams on the abutments.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A modular fiber reinforced polymer (FRP) composite deck module, comprising:
   one or more composite hexagonal component, each hexagonal component being a hexagonal cell having a hexagonal space, made of two or more layers of multi-axial fiber reinforced fabric adhered together by a resin matrix, said layers of fabric being continuous throughout the entire shape of said hexagonal cell;
   one or more composite double trapezoidal components, each said composite double trapezoidal component comprising a top side; a bottom side; a first trapezoid having a first top and a first bottom; and a second trapezoid having a second top and a second bottom; wherein said first trapezoid is inverted such that said first top of said first trapezoid is adjacent to and integrated with said second top of said second trapezoid, thereby creating a center seam and an extensive bonding surface, said top side of said double trapezoidal component is integrated with said first bottom of said first trapezoid and extends beyond said first bottom of said first trapezoid, said bottom side of the double trapezoidal component is integrated with said second bottom of said second trapezoid, and made of two or more layers of multi-axial fiber reinforced fabric adhered together by a resin matrix, said layers of fabric being continuous throughout the entire shape of said composite double trapezoidal component; and
   a means for interlocking one said composite hexagonal component and one said composite double trapezoidal component, wherein said composite hexagonal component fits within said extensive bonding surface of said composite double trapezoidal component and under a portion of said top side of said composite double trapezoidal component that extends beyond said first bottom of said first trapezoid.

2. The modular FRP composite deck module according to claim 1, wherein each side of said composite hexagonal component is equal in length.

3. The modular FRP composite deck module according to claim 2, wherein said first trapezoid and said second trapezoid are of equal dimensions.

4. The modular FRP composite deck module according to claim 1, wherein said composite hexagonal components and said composite double-trapezoidal components are manufactured by Vacuum Assisted Resin Transfer Molding.

5. The modular FRP composite deck module according to claim 1, wherein said composite hexagonal components and said composite double-trapezoidal components are manufactured by the pultrusion process.

6. The modular FRP composite deck module according to claim 1, wherein said means for interlocking comprises an adhesive bond along said extensive bonding surface.

7. The modular FRP composite deck module according to claim 1, wherein said means for interlocking is a mechanical fastener.

8. The modular FRP composite deck module according to claim 7, wherein said mechanical fastener is selected from a bolt with a nut, a threaded stud, a dowel, and an exterior interlocking and clamping channel.

9. The modular FRP composite deck module according to claim 1, further comprising a filler in said hexagonal space, said first trapezoid, or said second trapezoid.

10. The modular FRP composite deck module according to claim 9, wherein said filler is selected from the group of thermal insulation, noise reduction insulation, and strength enhancement.

11. The modular FRP composite deck module according to claim 1, further comprising an overlay placed over said top side of each said composite double trapezoidal component, thereby resulting in a uniform wearing surface.

12. The modular FRP composite deck module according to claim 11, wherein said overlay is selected from the group of concrete, asphalt, polymer concrete, and bonded grid anti-skid surface.

13. The modular FRP composite deck module according to claim 1, further comprising one or more exterior FRP composite laminates, grids, plates or fabrics bonded continuously to said top side.

14. The FRP composite double trapezoidal component according to claim 1, wherein a said composite hexagonal component and a said composite double trapezoidal component are integrated into a single modular FRP composite deck module.

15. The modular FRP composite deck module according to claim 1, wherein said bottom side of said double trapezoidal component extends beyond said second bottom of said second trapezoid.

16. The modular FRP composite deck module according to claim 1, wherein one or more of said layers of multi-axial fiber reinforced fabric is selected from the group of unidirectional rovings, continuous strand rovings, chopped strand mats, continuous strand mats, woven cloth and multiaxial stitched fabrics.

17. The modular FRP composite deck module according to claim 1, wherein said resin matrix is selected from the group of a polymeric resin, polyester resin, vinyl ester resin, epoxy resin, phenolic resin, and vinyl resin.

18. The modular FRP composite deck module according to claim 1, wherein one or more of said layers of multi-axial fiber reinforced fabric comprises a fiber material selected from the group of glass, carbon, aramid, and jute.

* * * * *